June 21, 1966 V. N. PARKHACHEV 3,256,584
INSTALLATION FOR PRODUCTION OF GLASS INSULATED
MICROWIRE DIRECTLY FROM LIQUID METAL
Filed May 21, 1963 7 Sheets-Sheet 1

FIG. 15

# United States Patent Office 3,256,584
Patented June 21, 1966

3,256,584
INSTALLATION FOR PRODUCTION OF GLASS INSULATED MICROWIRE DIRECTLY FROM LIQUID METAL
Vasily Nefedjevich Parkhachev, Moscow, U.S.S.R., assignor to Institute Metallurgii "A. A. Baikov," Moscow, U.S.S.R.
Filed May 21, 1963, Ser. No. 282,085
12 Claims. (Cl. 29—33)

This invention relates to the manufacture of small diameter wires, or more exactly to the manufacture of a glass insulated microwire.

It is known, that the process of manufacture of microwire by conventional method of drawing is laborious, requiring quite a number of reworkings and therefore, it is a very complex and expensive process. Furthermore, only bare metal wire of a minimum 30 microns in diameter can be produced by such method.

It is possible to draw wire from some plastic metal in diameter less than 30 microns (for instance 20 and sometimes even 10 microns) but the process is a very expensive and laborious one, and coating of such wire with a uniform layer of insulation even more difficult. At drawing of microwire through a number of dies the amount of surface damages is increased alongside with the decrease of the wire diameter. A degree of non-uniformity of insulation layer is also increased at enamelling of such wire. Therefore, the reduction of the diameter of the drawn microwire leads to a decrease of mechanical strength of the wire itself, and of electrical strength of its insulation layer, to a dangerous degree.

Thus, the conventional method of drawing does not provide for the effective production of microwire and in particular of glass insulated microwire in diameter up to 1 micron, required for the manufacture of various electrical instruments.

There are some other shortcomings which do not permit to produce microwire of the required quality on the known installation for wire drawing. Although some attempts have been made to overcome these difficulties, they have proved futile and only now this problem was successfully solved by us and practically accomplished by the present invention.

It has been established, that the proposed installation permits to obtain high quality glass insulated microwire from different metals and alloys in diameters from 1 to 50 microns.

The installation for this invention consists of a melting inductor powered by high-frequency generator, a device for feeding of glass tube into the melting zone, serving to form the microwire insulation layer and for putting in of the original metal, a device for cooling of cast wire incoming from the inductor, an instrument checking the wholeness (unbrokenness) of microwire being manufactured, and a receiver for reeling of finished microwire.

The main object of the present invention is to design an installation for production of high quality glass insulated microwire.

The second object of the invention is to accomplish an automatic feeding of glass tubing into the melting zone in proportion to its consumption.

The third object of the invention is to provide an automatic ceasing of glass tubing supply upon attainment of a definite and predetermined length of the manufactured wire. The invention also provides for a manual adjustment of the glass tubing position.

Furthermore, the invention provides for an automatic feeding of the original metal wire in accordance with the supply of the glass tubing into the melting zone in proportion to their consumption.

The invention provides also for an installation driving gear for the supply of original metal wire directly from the installation for the glass tubing feed with a possibility of cutting off (blocking) of the metal wire supply.

Among the other objects of the invention worth to mention is the possibility of wire range changes of the diameter of the manufactured microwire.

The design of the installation provides for an adjustment of the cooling process (crystallization) of the manufactured microwire.

The object of the invention is also to secure an automatic continuous control of the wire, produced by the proposed installation, for being intact.

Moreover, the installation provides for production of wire without stopping for replacing of charged spools of the receiver. At the same time, the receiver of the manufactured wire ensures replacement of the charged spools with automatic stop of their drive.

The invention also provides for the means of effecting the process of microwire forming at its melting in the crucible.

As follows from the aforesaid objects, the invention is based on a new arrangement and combination of units and parts of the design, described and presented for patenting in this description.

It is understood, that while accurately following the invention as described hereabove, some modifications within the claims may be introduced, yet without deviation from the main idea of the invention. Some other advantages of the invention will also appear in the description with reference to the submitted drawings.

FIGURES 1–15 show one of the variants of realization of installation according to the invention.

Figures 1, 2:
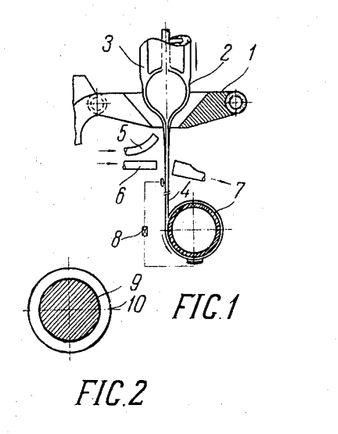
FIG. 1 shows the principal diagram of the installation.
FIG. 2 shows the transverse cross section of microwire, on an enlarged scale, manufactured on the described installation.

Application and interaction of the main elements of the installation is explained by the diagram shown in FIG. 1.

A batch of metal 2 in shape of a globular drop weighing 3–5 gm. and loaded in glass tubing 3, is melted in the field (working space) of the melting inductor 1.

The molten metal softens the tip of the glass tube, thus forming from it a thin glass capillary continuously fed with molten metal. Cast glass-coated microwire 4, obtained as described above, is uniformly drawn, and is cooled on its way by an air jet, supplied by the nozzle 5, and mainly by a current of water supplied by the nozzle 6, then it is crystallized, cooled and reeled upon removable spools 7. The rate of microwire production is adjusted in the range from 200 to 300 meters per minute. About 2000–3000 meters of unbroken glass insulated microwire can be obtained from one batch of metal. The control of the metal core wholeness is accomplished with the aid of a receiving-transmitting radioset 8.

FIG. 2 shows a transverse cross-section of the manufactured microwire, where the metal core is indicated by FIG. 9 and the glass case by FIG. 10.

Figure 3:
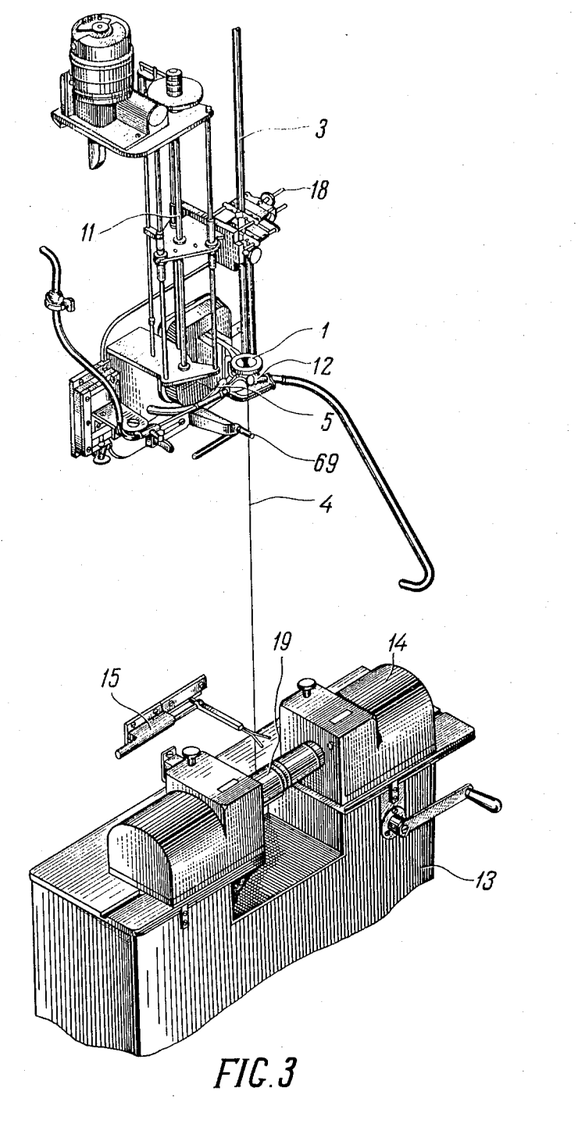
FIG. 3 shows the arrangement of main units of installation.

The patented installation consists of the following main units: melting inductor 1 (FIG. 3) powered by a high-frequency generator (not shown), device 11 for feeding of glass tube 3 into the melting zone, employed for the formation of the insulating layer of microwire and for putting in of the original metal, arrangement 12 for cooling of cast wire 4, incoming from the inductor, device controlling the wholeness of the manufactured wire, and receiver 14 for reeling of finished microwire, mounted on a bracket 13, with a laying mechanism 15.

Figure 4:
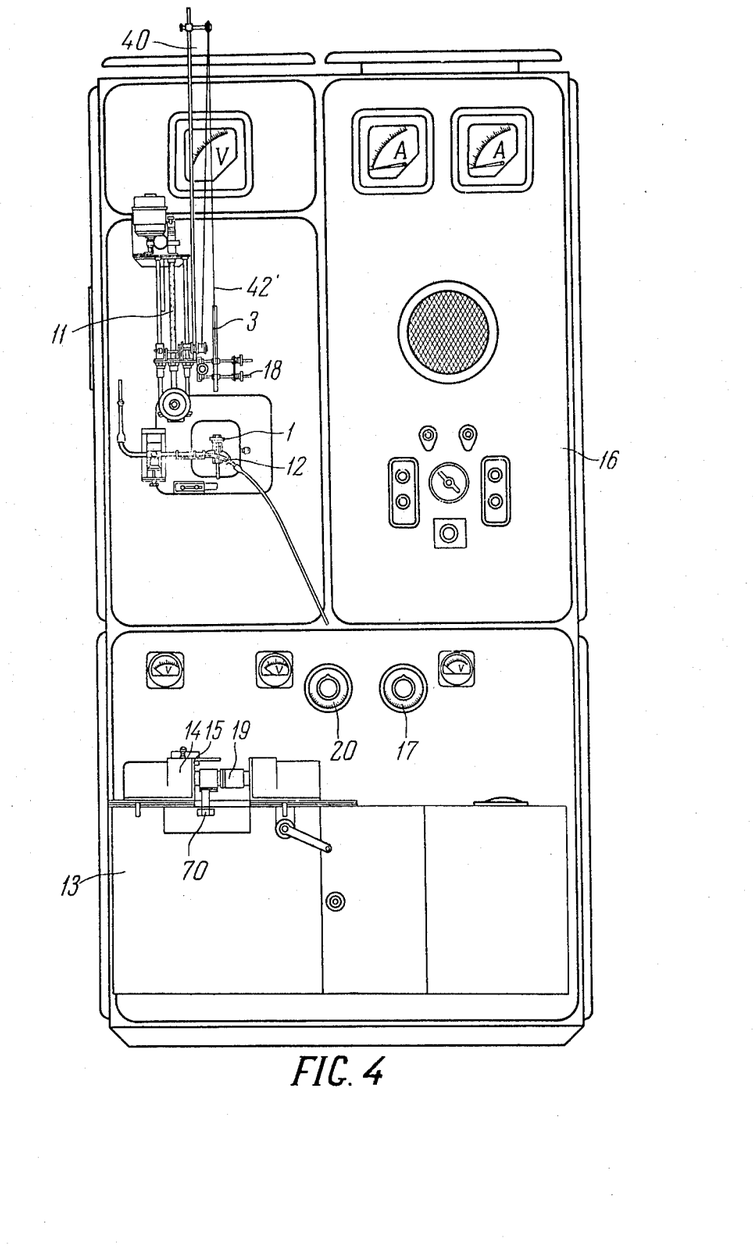
FIG. 4 shows general front view of the installation.

All the units of the installation, i.e. a device for feeding of glass tubing into the melting inductor, receiver, laying mechanism and others are mounted on the body 16 of a high-frequency tube generator (FIG. 4).

The designation of the above-mentioned high-frequency tube generator consists in that, that with the aid of the melting inductor 1 to melt the metal, intended for manufacture of microwire, which is placed in the glass tube 3 serving as a crucible. The generator is powered by alternating current mains of 220–380 volts.

All the mechanisms requiring control in the process of operation are mounted on the front upper panel of the generator body; all the elements of the electrical equipment of the installation (safety fuses, switches, measuring instruments, etc.) are assembled on the front lower panel of the generator body.

The device 11 provides for a constant and uniform feeding of glass tubing into the melting inductor. The speed of rotation of the engine shaft of the glass tube feed gear drive is adjusted by autotransformer, whose adjusting handle 17 of the input voltage is set on the front lower panel of the generator body.

The feed gear of the original wire is provided for in the glass tube feeding device 11, which supplies the drop of metal, already melted in the melting inductor, with additional new metal. This provides for a continuous drawing of the microwire during a prolonged period of time.

The glass tube is held with the aid of clamps 18.

The receiver 14 secures the reeling of microwire on bobbins 19 of the drawing-in spools, without interrupting the process of drawing. The amount of coiled microwire (in meters) is recorded by counters set inside the casing of the drawing-in spools drive.

The rotation speed of the electric motors of the spools drive is adjusted with the aid of an autotransformer provided for in the installation, the control handle 20 of which is also brought out upon the front panel of the generator.

The outside diameter of the glass coated microwire depends on the feeding speed of the glass tubing. At variations of the feeding speed of the glass tubing, the thickness of the glass coating is altered only and together with it the total diameter of the glass coated microwave is also altered. It has been shown experimentally, that the variation of the glass case thickness 10 (FIG. 2) practically does not affect the diameter of the metal core 9.

The diameter of microwire may be changed, by varying the number of rotations of the drawing-in spools and the cooling intensity of the microwire with air, incoming from the nozzle 5.

The alteration of the drawing speed of microwire causes the change of both the diameter of the metal core and the thickness of the glass case. The increase of intensity of air blowing causes the increase of viscosity of the softened glass and thereby may change the diameter of the metal core.

The above mentioned dependences were proven experimentally at operations of the described installation.

Figure 5:
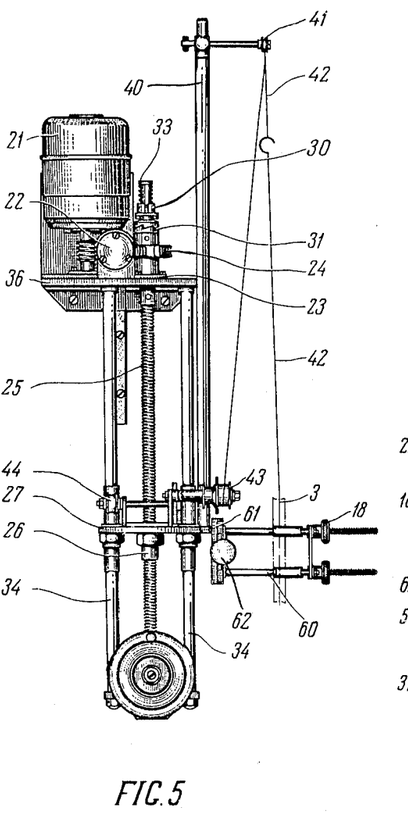
FIG. 5 shows general view of the device for supply of glass tubing with mechanism for feeding of the original metal wire, front view.
Figure 6:
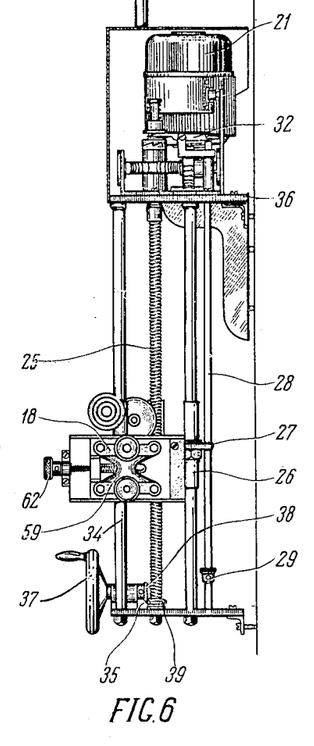
FIG. 6—general view of the device for supply of glass tubing with mechanism for feeding of the original metal wire side view.

FIGS. 5 and 6 show the design of the device 11 for feeding of the glass tubing 3 into the melting zone. This device comprises a mechanism which ensures a uniform, with adjusted speed feeding of glass tubing and an appliance for manual adjustment of glass tubing position in relation to the melting inductor. The tube feeding mechanism is set in motion by an electric motor 21 whose rotation speed is adjusted by an autotransformer. A rotary motion from the electric motor shaft 21 is transmitted to the guide screw 25 through a two-step worm reducing gear 22 and bushing 23 clamped with a worm gear 24. A movable level plate 27 is imparted with shifting movement from the guide screw 25 through a thread bushing connected with the level plate. Clamps 18 for a glass tube 3 are fastened to the plate 27 in the cantilever way.

A uniform feeding of glass tubing 3 into the melting zone of the inductor 1 (FIG. 3) is stipulated by a constant number of revolutions of the guide screw 25. When necessary, the speed of the tube feeding may be regulated with the aid of autotransformer by altering the number of revolutions of the electric motor 21, and consequently, of the guide screw 25. The working stroke of the level plate 27 with clamps 18 and tube 3 with the original metal is selected taking into account the production of a definite length of microwire, sufficient for interruption of the manufacturing process of microwire prior to the approach by the plate 27 of the terminal position.

An automatic disconnection of the tube feed gear, at the approach of the plate 27 of the extreme lower position, or at an attainment by the manufactured microwire of the predetermined length, is carried out by a mechanism comprising a pull-rod 28 with reversible stop 29, and open side action toothed coupling serving for disconnection and connnection of reducing gear 22 with a guide screw 25. The above mentioned coupling comprises two half clutches 30 and 31 and is connected with a pull rod 28 by a system of levers with an end lever fork 32.

The half clutch 31 is tied up with a worm gear 24, and the half clutch 30 has a ring groove for guides of a fork 32 and is put on the screw stem 25 with a possibility of axial motion only and is under the action of a pressure spring 33. This mechanism functions in the following way. At the approach by the plate 27, in the course of operation, of the lower position it interacts with the stop 29 of the pull rod 28, thus shifting it downwards. The pull rod 28, through a system of levers, turns the fork 32 and disconnects the coupling clutch. The guide screw 25, linked with the upper half clutch 30, stops to rotate and the movable plate 27, of the feeding gear stops, while the worm gear 24 with the lower half clutch 31 not linked with the guide screw 25, rotate idly.

The guiding struts 34, serving to shift the plate 27, are fixed in the lower plate 35 and upper plate 36 mounted on the generator body 16. An appliance for manual adjustment of the glass tube 3 position in relation to the melting inductor consists of a hand wheel 37 and bevel gears 38 and 39, with the latter one fastened permanently on the guide screw 25.

With the aid of this appliance the plate 27 may be lifted or lowered, and consequently clamps 18 and tube 3, connected with it, may also be lifted or lowered.

In order to lift the movable plate 27, and clamp with glass tubing, rigidly connected with it along the guide screw, it is necessary, pressing on the stop 29 downwards (that provides for disjunction of toothed half clutches 30 and 31) to rotate hand wheel 37 clockwise. Thereupon, the guide screw 25 through the bevel gears 38 and 39 would begin to rotate and the movable plate 27 would shift due to which fact the distance from the lower end face of the glass tube 3 to the melting inductor 1 will vary.

In order to secure a necessary duration of continuous process of microwire manufacturing with one charge of the crucible, an additional feeding with extra original metal should be provided for without interruption.

For this purpose, a mechanism for continuous feeding of the original wire into the melting zone, is provided for on the movable plate 27. Wire of the original metal is suspended through a roller 41 mounted on the strut 40 (FIG. 5) on a fine caprone thread 42 wound on the mechanism drum 43 (FIGS. 5 and 7) and carrying the wire 42 of the original metal. This mechanism comprises a friction rubber roller 44 on the shaft end 45 of which a pinion 46 is fastened, which is engaged with a pinion 47 set freely on the axle 48, secured on the mechanism frame 49 and provided with a face tooth, interacting with teeth 50 of the bushing 51, fastened to the drum 43. A nut 52 set on the axle end 48, with the aid of which the pressure spring 53 is held back in a bore of the drum 43. When the nut 52 gets loose the drum 53 may be displaced in an axial direction for disconnection of it from the roller 44 by means of leading out of teeth 50 of the bushing 51 with the pinion tooth 47. At shifting of the plate 27, the roller 44 rolls forward along the strut 34 and the drum 44 is made to rotate through a toothed couple 46–47.

Figure 7:
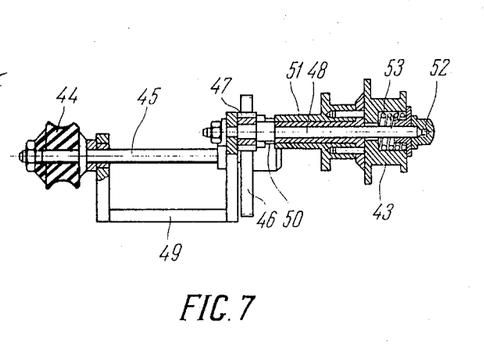
FIG. 7—mechanism for feeding of the original metal wire.

The caprone thread 42, wound on the drum 44, is unwound and the wire 42 of the original metal is lowered inside the glass tube into the crucible. The correspondence of the feeding speeds of the wire 42 and glass tubing 3 is provided for by selection of geometric correlations of the mechanism elements.

Figure 8:
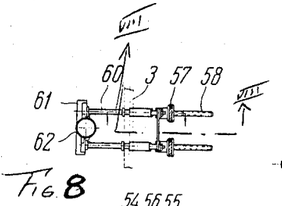
FIG. 8 shows the front view of clamps for glass tubing.
Figure 9:
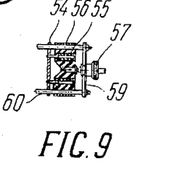
FIG. 9—clamps for glass tubing, cross-section through VIII—VIII as shown in FIG. 8.

For holding of the glass tube 3 in a vertical position, clamps 18, shown apart on FIGS. 8 and 9, are provided on the plate 27. The glass tube 3 is pressed to the textolite blocks 56 by cleats 54 with the aid of springs 55. The position of the glass tubing is regulated by two nuts 57 set on the threading pins 58 which are fastened in the blocks 56.

Nuts 57 are disposed freely in the plank 59, secured at the ends of the struts 60, mounted on the bracket 61 of the plate 27, but excluding the possibility of axial displacement.

Adjustment of the tube position is also secured by the screw 62.

The nuts 57 and the screw 62 allow to center the tube 3 in relation to the housing of the melting inductor 1.

Figure 10:
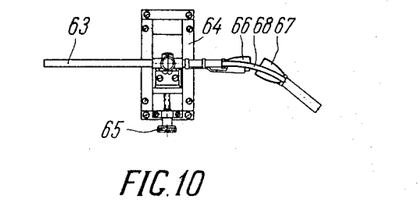
FIG. 10 shows general view of the device for cooling of microwire incoming from the melting inductor.

For cooling of microwire coming out of the inductor, and with the purpose of facilitating the crystallization of molten metal and creating of monolithic current-conducting core in a glass capillary a cooling device (crystallizer) is provided for in the installation. The crystallizer, shown in FIG. 10, represents in itself a delivery manifold 63, installed on the bracket 64, which is fastened to the generator body 16.

The manifold installed on the bracket 64 may have a horizontal displacement in order to lead it away from the drawing microwire at the moment of setting it into receiving spools for the process of drawing, and vertical displacement for its adjustment in relation to the melting inductor accomplished by the adjusting screw 65.

The cooling device includes also a nozzle 66 feeding the jet of liquid, and a funnel 67 intended for reception of spent liquid between which a cooled microwire, drawn from the inductor passes through. The nozzle and a funnel are connected between themselves by a clamp 68.

The design of installation includes a radio receiver and a radio transmitter (FIG. 11) serving for determination of the metal core wholeness in the process of its reeling on the receiving spools. The radio transmitter operates on a beam tetrode and is tuned up to the frequency of 1500 kc./s.

The radio transmitter antenna 69 (FIG. 3) is set at the outlet of microwire from the melting inductor, immediately after the crystallizer, and the radio receiver antenna 70 (FIG. 4) is set under the reeling spools and is built in the bracket case 13. Both antennae with microwire form two interconnected capacities: the first capacity—antenna of the transmitter and the microwire; the second capacity—wire reel and the antenna of the radio-receiver.

Figure 11:
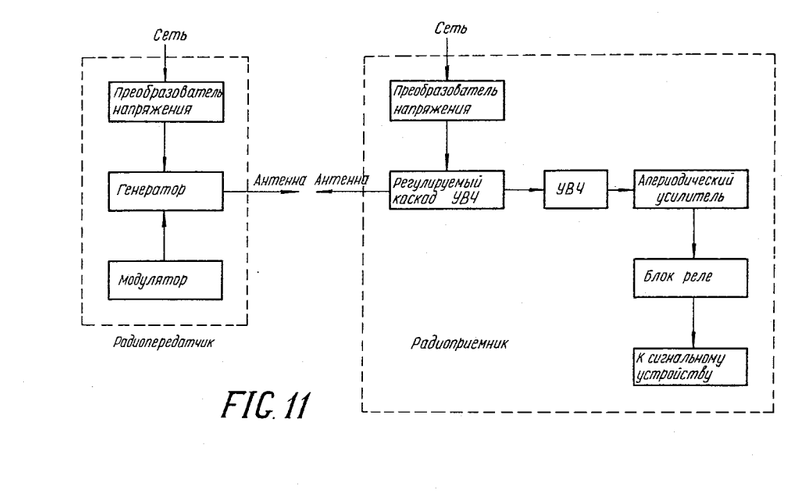
FIG. 11 shows the block-diagram of radio receiver and transmitter for control of the metal core wholeness.

If there is no break in microwire, then the oscillations from the radio transmitter go into the radio receiver through both capacities and are amplified by voltage of pentodes of an aperiodic amplifier, and detected by the triode of the latter, so that, a negative signal enters the tetrode grid of the block-relay and closes it up.

On the other hand, when a break of microwire is detected then the coupling between the capacities is disturbed and the signal does not enter the inlet of the radio receiver. The tetrode unlocks and delivers the feeding to the electromagnetic relay winding, as a result of which the bulb of the signal device is switched off and the bell rings up.

Thus the break of microwire is recorded by a sound signal (the bell) and a light signal (the signal bulb goes out).

Figure 12:
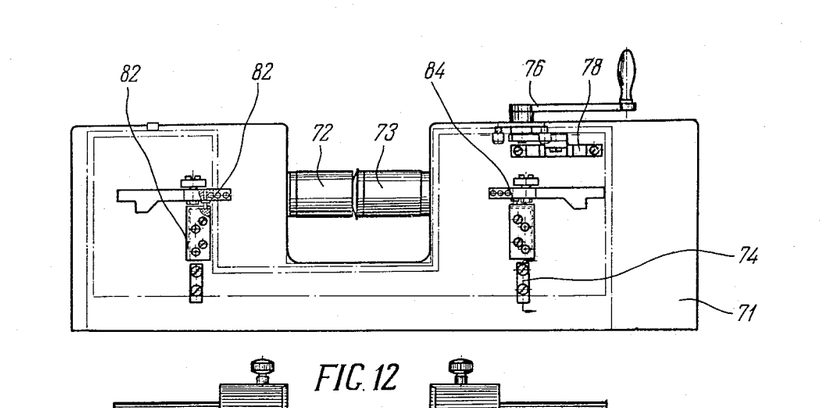
FIG. 12 shows the bottom view of the receiver.
Figure 13:
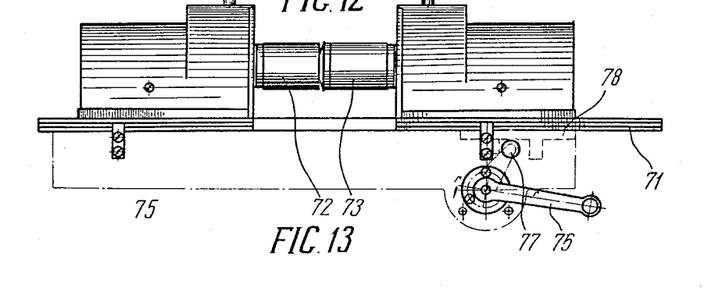
FIG. 13 shows the front view of the receiver.
Figure 14:
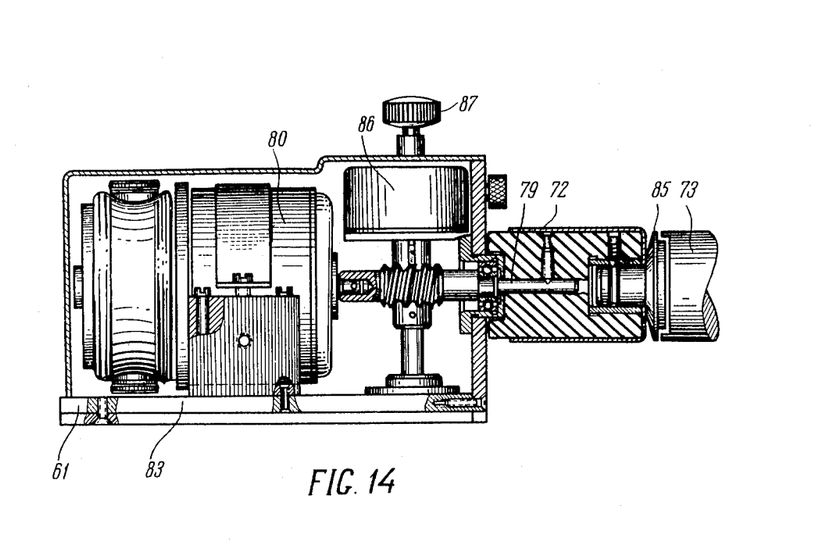
FIG. 14 shows cross-section of the receiver.

The receiver 14 (FIG. 3) of the installation shown apart in FIGS. 12, 13 and 14, consists of a plate 71 and of two driving spools 72 and 73 set on the plate, which take on alternately the manufactured microwire. The plate 71 rests by its base on the upper sheet of the bracket 13 and is fastened to it with the aid of two cleats 74 and two guiding planks 75 determining the plate position.

For the process of continuous winding of microwire, i.e. for replacing of the spool bobbin charged with microwire by a new one, the plate 71 may be shifted in an axial direction.

The shifting of the plate is accomplished by turning of the crank handle 76 on whose crank a roller 77 is eccentrically set, freely sliding in the fork 78, fastened to the plate.

The spindles 79 (FIG. 14) of the receiving spools are fastened to the shafts of electric motors 80. The number of revolutions of the receiving spools can be adjusted with the aid of autotransformer.

For power supply of the electric motors 80, blocks 81 are provided for on the bracket 13 with contact plates 82, and current-collectors 84 are set on the lower sheets 83 of the spool drives bodies.

For clamping of the microwire end at the beginning of reeling, the spool 72 is furnished with a mushroom 85 moving in an axial direction. Each of the spools 72 and 73 together with their drives may be shifted also on the plate 71 in an axial direction. This is necessary for replacing of the bobbin of one of the receiving spools with microwire wound on it by a new bobbin. The degree of shifting of the receiving spools is limited by grooves (not shown) on the plate 71.

After charging of one of the spools, the plate 71 is displaced by a crank handle 76, so that the microwire 4 starts to reel on the other spool. Simultaneously, due to the presence of the current collectors 84, the power supply of the motor of the brought out charged spool is cut off automatically and the motor of a new spool is switched on to the power source.

For the removal of the charged bobbin, the corresponding spool is shifted along the plate 71.

For determination of the amount of microwire (in meters) wound on a bobbin of each receiving spool, counters 86 are provided for which are switched in and switched off by handles 87. An appliance 15 for distribution (laying) of reeling wire along the spool length is driven by an individual electric motor.

The invention includes also (FIG. 15) a modification of the inductor design with nozzles immediately built in the inductor for the supply of compressed air facilitating the forming of microwire.

In this case the melting inductor (FIG. 15) is made in the form of a metal ring 88, which simply constitutes a turn of a secondary winding of a high-frequency generator.

Figure 15:
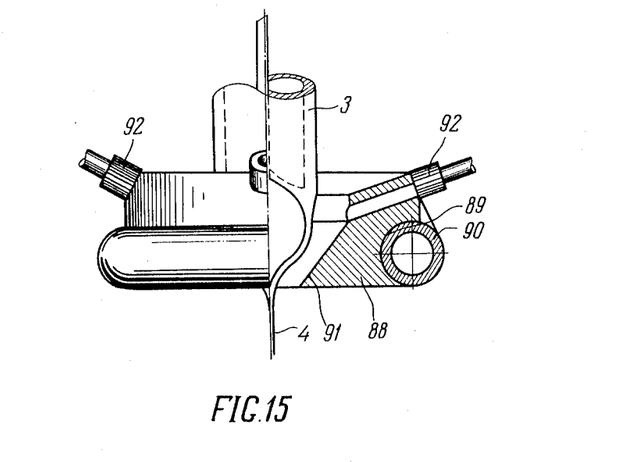
FIG. 15 shows a variant of realization of the melting inductor.

A tube 90 is placed in the groove 89 of the ring 88 through which cooling liquid is being circulated. The ring 88 has conical shape recess 91 with a central hole, dimensions and shape of which secure retention of molten metal in the tube and also enhance the forming of microwire. Forming of microwire is also facilitated by nozzles 92 used for the delivery of compressed air jets into the melting zone.

Although, the present invention has been described in accordance with preferable method of realization, it is understood that some modifications and variations may be introduced without deviation from the main idea and the extent of the invention. Such modifications and variations shall be considered within the claims of the invention and proposed clauses of patenting.

What I claim is:

1. The installation for production of glass insulated metal microwire comprising: a melting inductor powered by a high frequency generator, a device for feeding of glass tube into the melting zone, serving to form the insulating layer for microwire and for putting in of the original metal, a device for cooling of cast wire incoming from the inductor, an instrument checking wholeness of the manufactured microwire and a receiver for reeling of finished microwire; the above mentioned device for feeding of glass tube into the melting zone includes a screw mechanism ensuring a uniform, with predetermined speed, feeding of glass tube in proportion to its consumption and an appliance for additional adjustment of the glass tube position in relation to the recess of the melting inductor; furthermore, the dimensions and the shape of the recess and its hole are selected in such a manner as to exclude the passing through it of a vertically located glass tube.

2. The installation for production of glass insulated metal microwire comprising: a melting inductor powered by a high frequency generator, a device for feeding of glass tube into the melting zone, serving to form the insulating layer for microwire and for putting in of the original metal, a device for cooling of cast wire incoming from the inductor, an instrument checking the wholeness of the manufactured wire and a receiver for reeling of finished microwire; the above mentioned device for feeding of glass tube into the melting zone includes a mechanism for feeding of glass tube with predetermined speed, comprising an adjustable electric motor, vertical drive screw set in rotation by the above-mentioned electric motor through a reducing gear, a plate moving along the vertical guides and set in motion by the above-mentioned drive screw with the aid of a toothed bushing fixed to the plate, and clamps for a glass tube, fastened to the above-mentioned plate, and an appliance for readjustment of the above-mentioned clamps in a horizontal plane.

3. The installation for production of glass insulated metal microwire comprising: a melting inductor powered by a high-frequency generator, a device for feeding of glass tube into the melting zone, serving to form the insulating layer for microwire and for putting in the original metal, a device for cooling of cast wire incoming from the inductor, an instrument checking the wholeness of the manufactured wire and a receiver for reeling of finished microwire; the above-mentioned device for feeding of glass tube into the melting zone includes a mechanism ensuring the feeding of the glass tube with a predetermined speed comprising a vertical drive screw set in relation by an electric motor through a reducing gear, plate bearing the clamps for the tube and furnished with a toothed bushing for a drive screw, a pull rod carrying a stop, interacting with the above-mentioned plate at its approach to the assigned position and a one-sided action clutch coupling linked with the above-mentioned pull rod and serving for connection and disconnection of the reducing gear with a drive screw.

4. The installation for production of glass insulated microwire, comprising: a melting inductor powered by a high-frequency generator, a device for feeding of glass tube into the melting zone, serving to form the insulating layer for microwire and for putting in of the original metal, a device for cooling of cast wire incoming from the inductor, an instrument checking the wholeness of the manufactured wire, and a receiver for reeling of finished microwire; the above-mentioned device for feeding of glass tube into the melting zone includes a mechanism ensuring the feeding of the glass tube with a predetermined speed comprising a vertical drive screw set in rotation by an electric motor through a reducing gear, plate bearing the clamps for the tube and furnished with a toothed bushing for a drive screw, and a device for manual adjusting of glass tube position in relation to the melting inductor, consisting of a hand wheel and a conical gear drive linked with a drive screw.

5. The installation for production of glass insulated microwire, comprising: a melting inductor powered from a high-frequency generator, a device for feeding of glass tube into the melting zone, serving to form the insulating layer for microwire and for putting in of the original metal, a device for cooling of cast wire incoming from the inductor, an instrument checking the wholeness of the manufactured wire, and a receiver for reeling of finished microwire and a device for automatic supply of original metal wire into the melting zone through the hollow of the glass tube.

6. The installation for production of glass insulated microwire, comprising: a melting inductor powered from a high frequency generator, a device for feeding of glass tube into the melting zone serving to form the insulating layer for microwire and for putting in of the original metal wire, a device for cooling of cast wire incoming from the inductor, an instrument checking the wholeness of the manufactured microwire, and a receiver for reeling of finished microwire and a device for automatic supply of original metal wire into the melting zone and consisting of a drum round which a flexible pull-rod is wound, which is thrown over a deflecting roller and bearing on its free end the original metal wire, disposed inside the aforesaid glass tube, and friction roller connected with the aid of a mechanical driving gear to the above-mentioned drum interacting during the movement of the plate with the vertical guide of the aforesaid plate.

7. The installation for production of glass insulated metal microwire, comprising: a melting inductor powered from a high frequency generator, a device for feeding of glass tube into the melting zone serving to form the insulating layer for microwire and for putting in of the original metal, a device for cooling of cast wire incoming from the inductor, an instrument checking the wholeness of the manufactured microwire, a receiver for reeling of finished wire and a device serving to adjust the diameter of the manufactured microwire executed in a form of a nozzle supplying the compressed air into the melting zone.

8. The installation for production of glass insulated metal microwire, comprising: a melting inductor powered from a high frequency generator, a device for feeding of glass tube into the melting zone, serving to form the insulting layer for microwire and for putting in of the original metal, a device for cooling of cast wire incoming from the inductor, an instrument checking the wholeness of the manufactured microwire and a receiver for reeling of finished microwire; the aforesaid device for cooling of cast wire incoming from the inductor consists of a nozzle supplying the jet of a cooling liquid, a funnel intended for the reception of the spent liquid and of a device adjusting the nozzle position.

9. The installation for production of glass insulated metal microwire, comprising: a melting inductor, a device for feeding of glass tube into the melting zone, serving to form the insulating layer for microwire and for putting in of the original metal, a device for cooling of cast wire incoming from the inductor, a receiver for reeling of finished microwire and an instrument checking the wholeness of the manufactured microwire, consisting of a radio transmitter and radio receiver, located between the microwire cooling device and the receiving device and which corespondingly tune and remove high frequency oscillations from the microwire; the radio-receiver is equipped with a control appliance, which in case of a metal core brake and caused by it changes in the level of receiving signal switches on the signalling system of the installation.

10. The installation for production of glass insulated metal microwire, comprising: a melting inductor, powered by a high frequency generator, a device for feeding of glass tube into the melting zone, serving to form the insulating layer for microwire and for putting in the original metal, a device for cooling of cast wire incoming from the inductor, an instrument checking the wholeness of the manufactured microwire and a receiver for reeling of finished wire, consisting of coaxially disposed driven and easily removed bobbins connected with revolutions counters and mounted on a plate moving in an axial direction.

11. The installation for production of glass insulated metal microwire, comprising: a melting inductor powered by a high frequency generator, a device for feeding of glass tube into the melting zone, serving to form the insulating layer for microwire and for putting in of the original metal, a device for cooling of cast wire incoming from the inductor, an instrument checking the wholeness of the manufactured wire and a receiver for reeling of finished wire which includes coaxially disposed driven and easily removed bobbins, connected with revolutions counters and mounted on a plate moving in an axial direction; the moving of the aforesaid plate is accomplished with the aid of manual crank drive, while the bobbins are driven with the aid of individual electric motors; the aforementioned electric motors are powered by currents supplied by current collecting contacts mounted on the above mentioned plate; these contacts interact with current-carrying busbars fixed stationary on the installation frame; the aforesaid busbars are disposed in such a way that at leading off of the aforementioned bobbin in order to stop reeling upon it of microwire, the power supply of the corresponding motor is automatically switched off.

12. The installation for production of glass insulated metal microwire, comprising: a melting inductor, executed with nozzles for supplying of compressed air jets into the melting zone which facilitate the forming of microwire, a device for feeding of glass tube into the melting zone, a device for cooling of cast wire incoming from the inductor, an instrument checking the wholeness of the manufactured wire and a receiver for reeling of finished microwire.

References Cited by the Examiner
UNITED STATES PATENTS

| | | | |
|---|---|---|---|
| 2,313,296 | 3/1943 | Lamesch | 65—121 |
| 2,328,998 | 9/1943 | Radford | 65—145 |

RICHARD H. EANES, JR., *Primary Examiner.*